United States Patent [19]

Rantala et al.

[11] Patent Number: 4,912,623
[45] Date of Patent: Mar. 27, 1990

[54] MULTIPLE PROCESSOR COMMUNICATIONS SYSTEM

[75] Inventors: Glen W. Rantala, Menomonee Falls; Donald R. Janke, Milwaukee, both of Wis.

[73] Assignee: Square D Company, Palatine, Ill.

[21] Appl. No.: 179,969

[22] Filed: Apr. 11, 1988

[51] Int. Cl.⁴ .............................................. G06F 15/16
[52] U.S. Cl. ..................................... 364/136; 364/140
[58] Field of Search ................................ 364/131–138, 364/140

[56] References Cited

U.S. PATENT DOCUMENTS

| | | | |
|---|---|---|---|
| 3,689,895 | 9/1972 | Kitamura | 364/300 |
| 4,118,789 | 10/1978 | Casto et al. | 364/900 |
| 4,165,534 | 8/1979 | Dummermuth et al. | 364/900 |
| 4,200,915 | 4/1980 | Struger et al. | 364/900 |
| 4,215,397 | 7/1980 | Hom | 364/136 |
| 4,646,289 | 2/1987 | Tsiakas et al. | 370/76 |
| 4,716,541 | 12/1987 | Quatse | 364/900 |

FOREIGN PATENT DOCUMENTS 3241357 4/1984 Fed. Rep. of Germany .

Primary Examiner—Allen MacDonald
Attorney, Agent, or Firm—Leo J. Aubel; Michale J. Femal; Thomas K. Stine

[57] ABSTRACT

A multiple processor communications system including a control processor and a scan processor having its own program counter enabling the efficient execution of subroutines. The scan processor directly accesses a compiled user memory which contains its operating program and also directly accesses the image memory which contains the input and output data to perform the computations required by the program. The system includes error codes for distinguishing various error conditions including collision error conditions indicating illegal commands to the scan processor when it is scanning and parity errors in the compiled user memory and in the image memory.

5 Claims, 2 Drawing Sheets

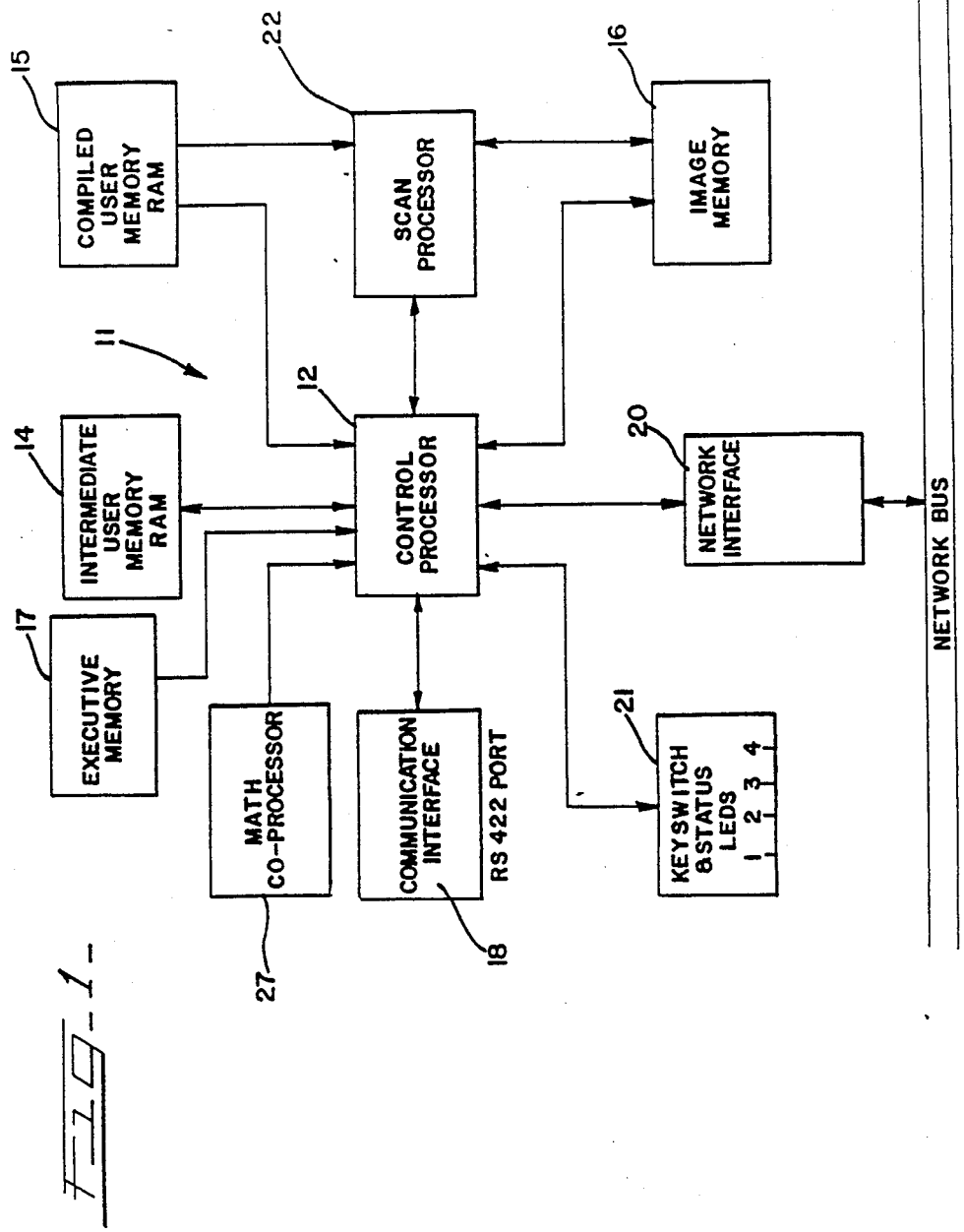

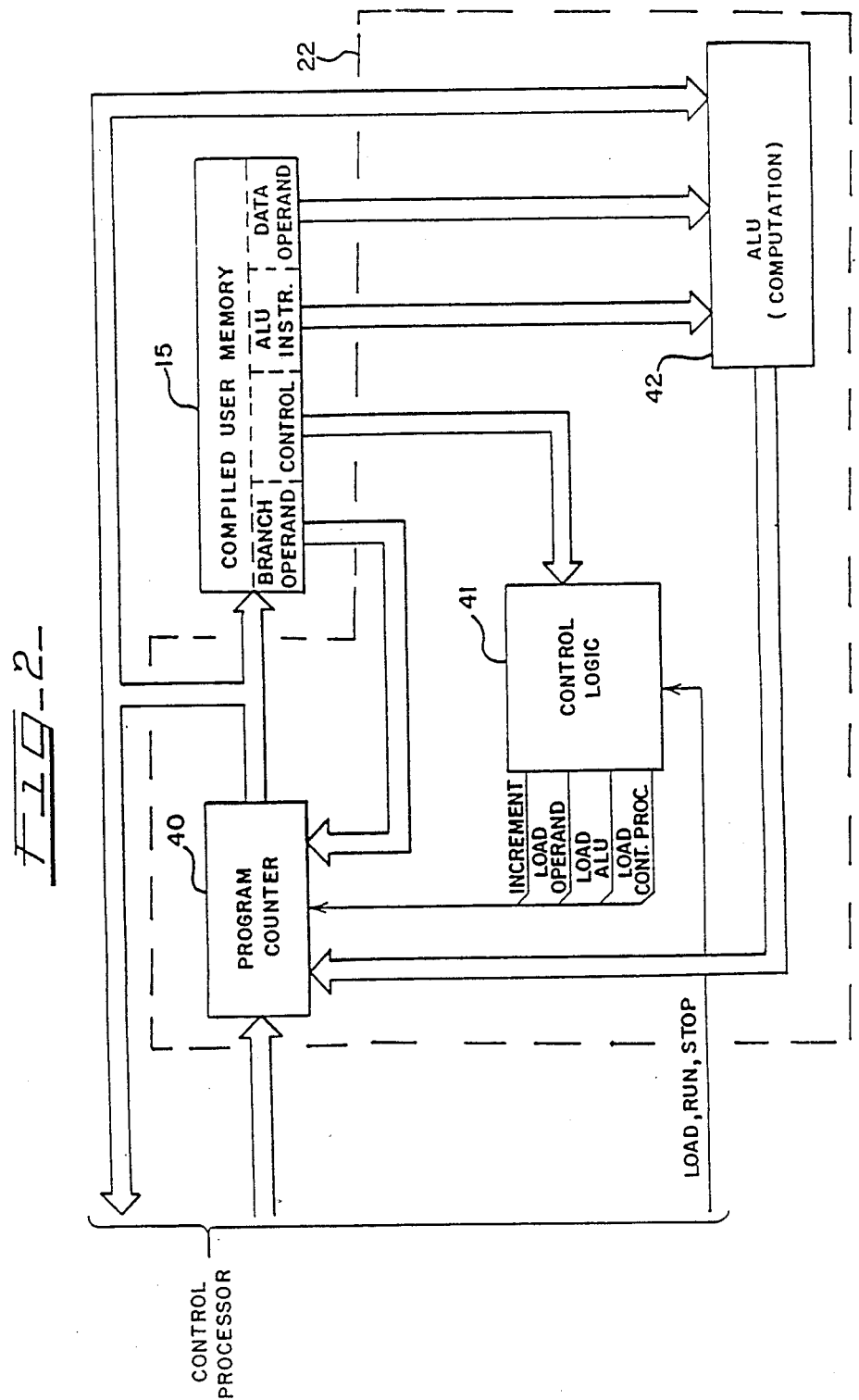

MULTIPLE PROCESSOR COMMUNICATIONS SYSTEM

REFERENCE TO RELATED APPLICATIONS

This application is related to applications filed concurrently herewith, entitled "Ladder Sequence Controller", Ser. No. 180,093; "Peer-To-Peer Register Exchange Controller for PLCs", Ser. No. 179,674; "High-Speed Press Control System", Ser. No. 179,743; and, "Bus interface Board System", Ser. No. 179,756. The contents of these applications are incorporated herein by reference.

TECHNICAL FIELD

This invention relates generally to a programmable logic controller for controlling machine tools and particularly relates to a programmable logic controller having a control processor, and an associated scan processor with its own program counter.

BACKGROUND OF THE INVENTION

The use of programmable logic controllers or PLCs to control machine tools such as punch presses, screw machines and automatic welders is well-known. The PLCs contain microprocessors operating under a set of sequential instructions to sense the condition of the machine tool, and to provide outputs for controlling the closing and opening of valves and switches to operate the machine tool.

Previously, some of these PLCs have used a control processor and scan processor arrangement to increase the processing of status and control information. In one such PLC, the control processor assigned certain instructions to the scan processor, and when the scan processor finished, the control processor assigned another routine to the scan processor. For that reason, the scan processor never needed a separate readable program counter because it only performed inline routines and never needed to save the contents of the program counter to do a subroutine.

It would be desirable to operate this PLC with subroutines fetched directly from a user compiled memory so as to expedite the operation of the PLC and to identify the different error conditions occurring in the scan processor so that the control processor can determine if the error was momentary or continuous and act accordingly.

SUMMARY OF THE INVENTION

The invention furnishes the ability for both the control processor and the scan processor to read the contents of a program counter. The ability of the scan processor to read the program counter facilitates the scan processor to execute subroutines on its own without direction from the control processor.

The invention also provided control logic identifying a parity error in the compiled user memory, a parity error in an image memory or an incorrect command from the control processor to the scan processor.

This assures that the data is accurate before it is coupled as an input into the scan processor.

BRIEF DESCRIPTION OF THE DRAWINGS

FIG. 1 is a block diagram of a programmable logic controller of the invention controlling a machine tool; and, FIG. 2 is a block diagram of the circuit connection of the program counter, and including the control logic that identifies the different operating conditions.

DESCRIPTION OF THE PREFERRED EMBODIMENT

FIG. 1 shows a block diagram of a processor system 11 in accordance with the invention. System 11 includes an executive memory 17 intermediate user memory 14, compiled user memory 15, a communications interface 18, a bus interface 20 and a keyswitch 21. The foregoing component blocks will be described herein below. The system 11 also includes scan processor 22 and a math coprocessor 27. The scan processor 22 scans and executes a ladder logic program stored in the compiled user memory ram 15. The math co-processor 27 performs the math functions required in response to control from the control processor 12.

Control processor 12, which is of suitable known design, coordinates all processor system 11 operations. This includes performing all communication via a communications interface port and a system bus. Control processor 12 also compiles the ladder program in the compiled user memory and also handles all interrupts and error conditions from the scan processor, system bus, and the remainder of the programmable controller system. In this mode, the scan processor 22 performs computation of output states and register values based upon the current state of inputs and registers; the operations and the sequence in which they are performed is controlled by the program in the compiled user memory. The control processor accesses state and register values accessed from the image memory.

The intermediate user memory 14 and the compiled user memory 15 comprises two distinct portions of memory for maximum efficiency in scanning and program manipulation. The intermediate user memory 14 is a separate RAM and contains a compiled version of the code which is optimized to serve as executable instructions for the scan processor.

In operation, the program from the intermediate user memory 14 is compiled and then downloaded to the compiled user memory 15. Compiled user memory 15 is implemented with static CMOS devices which are battery backed and parity protected.

The compiled user memory provides 64-bit compiled user program storage for up to 32K words. Each word is comprised of scan processor instructions and control codes, and two 16-bit operands for data or program control.

The compiled user memory is randomly accessible by the control processor for purposes of loading and editing user programs. The scan processor accesses the compiled user memory directly as an executive memory of successive instructions. Access by the scan processor is limited to read only operations on the two 16-bit operands when they are coded as immediate data. Branches or subroutines require alteration of the program counter per operand contained in the instruction or scan processor computation.

Importantly, the scan processor controls its own program counter, which points to the compiled user memory. This capability permits the user to utilize subroutines rather than repeated sections of in-line code in his program, for timers and coaunters, etc. By using the same subroutine over and over again for such functions as timers, the amount of required memory to hold this code is greatly reduced.

FIG. 2 is a block diagram indicating communications to the program counter of the scan processor 22 and the control logic identifying various operating commands. Importantly, as indicated, the program counter 40 communicates directly with the compiled user memory 15 and the ALU 42. The various command registers in compiled user memory 15 are labeled in FIG. 2 and effect control of the program counter 40 through logic control 41. The branch operand registers of memory 15 couple directly to the program counter 40.

The executive program that is being executed by the scan processor may be represented as follows:

| EXECUTIVE PROGRAM (Compiled and downloaded to compiled user memory) | | |
|---|---|---|
| Address | Instruction # | Instruction |
| 0000 | 1 | Instr. |
| | 2 | Instr. |
| | 3 | GOSUB A |
| | 4 | Instr. |
| | 5 | GOSUB B |
| | 6 | GOSUB B |
| | 7 | GOSUB A |
| | 8 | Instr. |
| | 9 | GOSUB A |
| NNNN | 10 | GO TO #1 |

Instructions 1 through 10 are executed in a continuous loop. Instead of including the entire programming instructions for both subroutine A and B, each time they are required, this code is written only once, and then accessed by the alterable program counter.

| SUBROUTINE A | SUBROUTINE B |
|---|---|
| Instr. 1 | Instr. 1 |
| Instr. 2 | Instr. 2 |
| Instr. 3 | Instr. 3 |
| etc. | etc. |
| Return | Return |

The sequence for this operation would be as follows: The program counter (which contains the address of the next instruction to be executed) is incremented as the sequential instructions of the executive loop are executed. When a subroutine is encountered, the value of the next in-line sequential address for the program counter is stored away in a temporary register called a stack. The address in the program counter is then changed to the address of the subroutine. The program counter is then incremented sequentially to execute the instructions in the subroutine. When the subroutine "Return" instruction is encountered, the last address location that was written to the stack is now written into the program counter. This then points the program counter to the instruction in the executive loop that followed the last executive instruction. That last executive instruction was the instruction that directed the program counter to the last executed subroutine. The program counter thus continues executive instructions immediately following the last "go to subroutine" instruction.

The ability to control the program counter also permits the use of timed or event driven interrupts, which may be generated by intelligent I/O. This is because the interrupt will be handled in the same manner as the subroutines, in that the interrupt code is written as a subroutine, with a "return" terminator. The main difference between the subroutines described above, and the interrupt, is that the interrupt routine will be called by a hardware interrupt being generated, rather than an instruction which directs the program counter to the first instructions of the subroutine.

| INTERRUPT |
|---|
| Instr. 1 |
| Instr. 2 |
| Instr. 3 |
| etc. |
| Halt Instruction |

The scan processor executes the user program upon command from the control processor. The operation of the scan processor is stopped by a halt command received from the control processor, the execution of a halt instruction, or by parity error detected in either the compiled user memory or image memory.

This scan processor performs computation of output states and register values based upon the current state of inputs and registers. The operations and the sequence in which they are performed is controlled by the program contained in the compiled user memory. The I/O states and register values are accessed from the image memory.

The processor system 11 makes use of an image memory to hold the state of all I/O and registers. The contents of the image memory are transferred to the external I/O, and the present I/O state transferred to the image memory, at the end of every scan. Internal registers will not be transferred on the bus.

The time necessary to do an I/O update is a function of the number of I/O registers assigned to the system and the degree of register fragmentation. Register fragmentation occurs when there are inputs and outputs in the same register. The I/O can be allocated in groups of four, registers may contain up to four different I/O groups. During the I/O update, any forcing operations in effect will take place.

The ladder program is solved after the image memory 16 is set up. The program is normally scanned in ascending rung order beginning with rung number 1.

The image memory 16 consists of a battery-backed RAM that provides 16-bit data and status fields for user registers and control registers. The image memory 16 contains both the internal and external I/O and registers. Between scans, the control processor 12 transmits the current values in image memory 16 to the appropriate external devices. It also updates the image memory 16 according to the external I/O and registers in preparation for the next scan. Parity protection is provided for all bytes of the memory.

The image memory 16 table is fully accessible by the svcanning processor 22 and control processor 12.

The control processor is furnished with circuits to interface it to a math co-processor 27. This match co-processor 27 will perform math functions under the control of the control processor 12 and will free the control processor from this time-consuming task.

Since the control processor does not scan the ladder program, but has control of the math co-processor 27, the scanning processor 22 must interrupt the control processor 12 for floating point operations. A separate dedicated math co-processor 22 can perform the math operations more efficiently.

The key-operated selector switch 21 allows the control processor 12 to be locked into any one of four operating modes: RUN, RUN PROGRAM, DISABLE or HALT. In the RUN mode, the control processor 12 scans normally but cannot program, while in the RUN PROGRAM mode, the control processor 12 scans normally and the programmer can alter the ladder program. In the HALT mode, the control processor 12 is not operating on the program; and in the DISABLED OUTPUT mode, the control processor 12 operates on the ladder diagram program, but all external outputs are held in an off state.

The hardware of the scan processor 22 has the ability to distinguish between error conditions which occur when the scan processor is scanning.

More specifically, the scan processor reports a specific error code to the control processor to distinguish three categories or types of errors. For example, parity errors can be distinguished in the compiled user memory 15 and in the image memory 16. Also, collision errors, that is indications that the scan processor is receiving illegal commands from the control processor when the scan processor is running, can be distinguished.

One simplified example of the operation of the system 11 of FIG. 1 is as follows:

Assume that the system 11 is used in a bottling plant to control the operation of placing any empty carton in the proper loading location after the last carton as been filled with bottles, so that the empty carton can now be filled with bottles.

The empty carton is filled in response to a weight input signal. In response to a weight signal, an output will be provided to cause a component of the machine to push the full carton away from the loading machine and a second component of the machine to push to empty carton into the loading position to receive the bottles. The key switch 21 has been set to the RUN mode.

Upon a clear condition or power up, the user program is loaded into the CMOS RAM area of the intermediate user memory 14. At this time, the control processor 12 transfers this compiled program into the compiled user memory 15.

Assume a full carton is in the sensed position. This information will be received by the control processor 12 through the bus interface 20 and transferred to the image memory 16. All inputs and outputs contained in the image memory 16 are parity checked. A bit will then be set in image memory 16 by processor 12 to indicate the carton full state.

As the scan processor 22 executes the executive program in the compiled user memory 19, and compares input information from the image memory 16 in relation to the instructions in the executive program, it establishes that the carton full state has occurred. The scan processor 22 now knows that the carton is full, and that an event has occurred which requires an output to do two things, move the carton out of the way and move an empty carton into a loading position.

The scan processor 22 now sets the corresponding output bit in the image memory 16. The control processor 12 now reads the output bit in the image memory 16 and sends a signal to the output device through bus interface 20. The output device simultaneously moves the full carton off of the loading position and pushes the empty carton into the loading position.

The sensor input device now detects that there is an empty carton in the loading position (low weight of carton). This information is transmitted through the bus and bus interface 20 to the control processor 12. The control processor 12 then clears the corresponding input bit in the image memory 16. This is only one partial operation of one machine, however the data through the scan processor is evident.

Some control functions are math intensified such as input scaling. In a high-speed production situation, the required math calculation could take longer than the necessary scan period of the scan processor 27. In these cases, it is desirable to off-load math calculations to parallel math processor 27 to increase scan rate and not slow the scan rate down by the time taken to do the math calculations. In other words, the math calculations are provided by the math co-processor 27 such as not to reduce the scan rate of the system 11.

While the invention has been particularly shown and described with reference to a preferred embodiment thereof, it will be understood by those skilled in the art that various changes in form and detail may be made therein without departing from the spirit and scope of the invention.

We claim:

1. A programmable logic controller comprising:
   a user memory for containing executable instructions,
   an image memory for receiving and storing the state of inputs, outputs and register values;
   a scan processor coupled to said user memory and said image memory for performing said instructions stored in said user memory to compute the output states and register values of said image memory, said scan processor including a program counter indicating an address of said next instruction to be performed, a stack and means responsive to one of said instructions for moving said address of said next instruction to be performed from said program counter to said stack and for inserting an address of a different one of said instructions to be performed in said program counter, thereby causing said scan processor to perform said different instruction, and means for moving said moved address from said stack to said program counter upon completion of said different one of said instructions and;
   a control processor coupled to said user memory, said control processor providing management communication and supervisory functions for the system, said control processor including means for moving said address of said next instruction to be performed from said program counter to said stack and for inserting an address of a different one of said instructions to be performed in said program counter, thereby causing said scan processor to perform said different instruction, and means for moving said moved address from said stack to said program counter upon completion of said different one of said instructions.

2. A programmable logic controller as defined in claim 1, wherein the scan processor directly accesses said compiled user memory for executive instructions.

3. The programmable logic controller of claim 1 wherein said executable instructions comprise a ladder program.

4. The programmable logic controller of claim 1 wherein:
   said different one of said instructions comprises a first instruction of a subroutine; and said moved address is moved from said stack to said program counter upon completion of said subroutine.

5. A programmable logic controller comprising:

a user memory for containing executable instructions including a ladder program comprising a routine and a subroutine, said routine including an subroutine instruction to execute said subroutine;

an image memory for receiving and storing the state of inputs, outputs and register values;

a scan processor coupled to said user memory and said image memory for performing sequential steps of said routines and subroutines to compute the output states and register values of said image memory, said scan processor including a program counter indicating an address of said instruction of said next step to be performed, a stack and means responsive to said subroutine instruction for moving said address of said instruction contained in said program counter to said stack and for inserting an address of said first instruction of said subroutine in said program counter to cause said scan processor to perform said subroutine, and means for moving said moved address from said stack to said program counter upon completion of said subroutine and;

a control processor coupled to said user memory, said control processor providing management communication and supervisory functions for the system, said control processor including means for moving said address stored in said program counter to said stack and for inserting an address of a different one of said instructions to be performed in said program counter to cause said scan processor to perform said different instruction, and means for moving said moved address from said stack to said program counter upon completion of said different one of said instructions.

* * * * *